United States Patent
Ray

(10) Patent No.: US 10,105,819 B2
(45) Date of Patent: Oct. 23, 2018

(54) SUPPORT AND COUPLING ASSEMBLY FOR A SCREW AUGER HAVING MULTIPLE COUPLED SCREWS

(71) Applicant: RAYS WELDING SHOP, INC., Midlothian, TX (US)

(72) Inventor: Richard Ray, Midlothian, TX (US)

(73) Assignee: RAY'S WELDING SHOP, INC., Midlothian, TX (US)

( * ) Notice: Subject to any disclaimer, the term of this patent is extended or adjusted under 35 U.S.C. 154(b) by 372 days.

(21) Appl. No.: 15/098,922

(22) Filed: Apr. 14, 2016

(65) Prior Publication Data

US 2016/0304287 A1    Oct. 20, 2016

Related U.S. Application Data

(60) Provisional application No. 62/147,680, filed on Apr. 15, 2015.

(51) Int. Cl.
   *B65G 33/32* (2006.01)
   *B24C 9/00* (2006.01)
   *F16C 33/78* (2006.01)
   *F16C 19/18* (2006.01)

(52) U.S. Cl.
   CPC ............ *B24C 9/006* (2013.01); *F16C 19/184* (2013.01); *F16C 33/7856* (2013.01); *F16C 2326/58* (2013.01); *Y02P 70/179* (2015.11)

(58) Field of Classification Search
   CPC ..................... F16C 19/184; F16C 33/7856
   USPC .................. 198/670, 671, 672; 384/456, 472
   See application file for complete search history.

(56) References Cited

U.S. PATENT DOCUMENTS

| 3,289,819 A | * | 12/1966 | Steinmetz | B65G 33/32 198/666 |
| 3,848,938 A | | 11/1974 | Stella et al. | |
| 4,220,242 A | * | 9/1980 | Forsberg | B65G 33/32 198/658 |
| 4,641,743 A | * | 2/1987 | Kemp, Jr. | B65G 33/32 198/666 |
| 4,772,138 A | * | 9/1988 | Dreschmann | F16C 33/6674 277/559 |

(Continued)

OTHER PUBLICATIONS

Screw conveyor, Wikipedia, http://en.wikipedia.org/wiki/Screw_conveyor, 3 pages Feb. 1, 2015.

(Continued)

*Primary Examiner* — Douglas A Hess
(74) *Attorney, Agent, or Firm* — Jackson Walker, LLP

(57) ABSTRACT

A support and coupling assembly for a moving screw auger that is used to move grit, such as grit that is used in the blast cleaning industry. The support and coupling assembly includes a hanger bearing assembly with a hanger bearing bracket with an end for engaging a support surface, such as a wall or a ceiling, and a removed end. A roller bearing engages the removed end of the hanger bracket and a shaft is press fit into the roller bearing. A pair of hub assemblies with flights engages the shaft and rotates with the shaft. Connector assemblies engage the hub assemblies to connect the hub assemblies to screw portions on either side of the hanger bearing assembly. The flights on the connector assemblies will cause the grit to speed up as it moves from the screw portion to the connector assembly.

17 Claims, 17 Drawing Sheets

(56) References Cited

U.S. PATENT DOCUMENTS

| | | | | |
|---|---|---|---|---|
| 5,222,591 | A * | 6/1993 | Bertola | B65G 33/14 198/672 |
| 5,715,976 | A * | 2/1998 | Kautz | B65G 33/32 198/672 |
| 5,944,168 | A * | 8/1999 | Campbell | B65G 65/466 198/519 |
| 6,398,012 | B1 * | 6/2002 | Volpe | B65G 33/32 198/659 |
| 6,722,490 | B1 * | 4/2004 | Bass | A22C 21/0053 198/657 |
| 6,747,222 | B1 | 6/2004 | Wong et al. | |
| 6,951,273 | B2 * | 10/2005 | Bass | A22C 21/0053 198/657 |
| 7,318,675 | B2 * | 1/2008 | Kellogg, Jr. | B65G 33/32 198/672 |
| 8,136,654 | B2 * | 3/2012 | Moreland | B65G 33/30 198/666 |
| 8,403,128 | B2 * | 3/2013 | Farrell | B65G 33/32 198/666 |
| 8,561,786 | B2 | 10/2013 | Farrell et al. | |
| 9,121,445 | B2 * | 9/2015 | Kampen | F16C 27/066 |
| 9,303,684 | B2 * | 4/2016 | Clavijo Lumbreras | F16C 11/0695 |
| 9,717,256 | B2 * | 8/2017 | Shell | A22B 5/0076 |
| 9,752,621 | B2 * | 9/2017 | Olson | F16C 35/02 |
| 9,821,962 | B2 * | 11/2017 | Koenig | B65G 33/32 |
| 2004/0188226 | A1 * | 9/2004 | Bass | |
| 2014/0140649 | A1 | 5/2014 | Kampen | |

OTHER PUBLICATIONS

Fundamentals of Design, Topic 10, Bearings, Alexander Slocum, 85 pages Jan. 1, 2008.

Kase Custom Conveyors, Basic Conveyor Flight & Pitch Types, www.kaseconveyors.com/bulk-material-handling-products/engineering-guide/conve . . . , 2 pages Apr. 10, 2015.

* cited by examiner

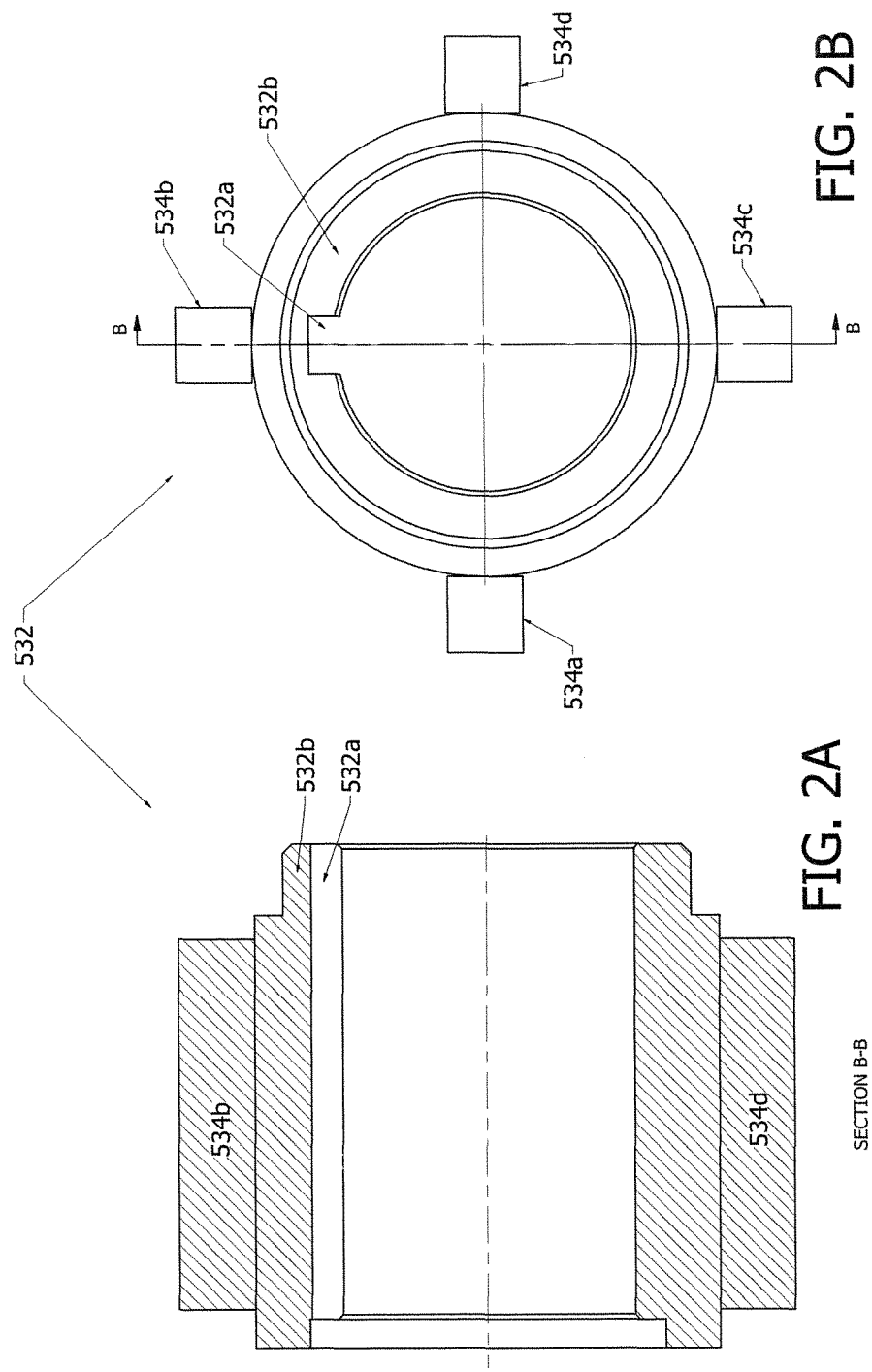

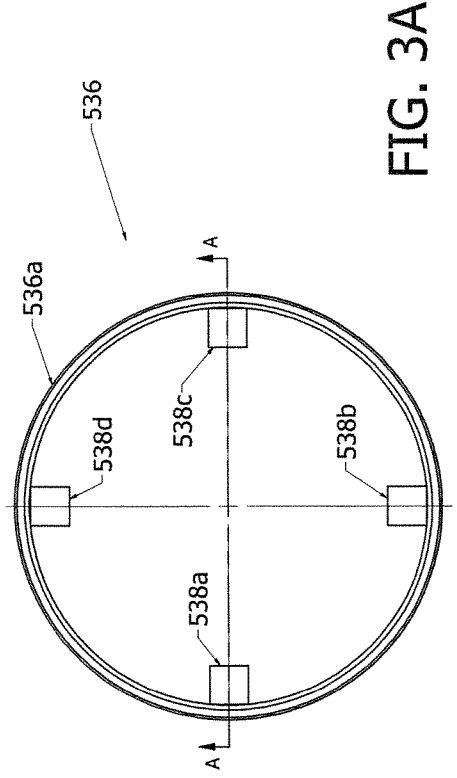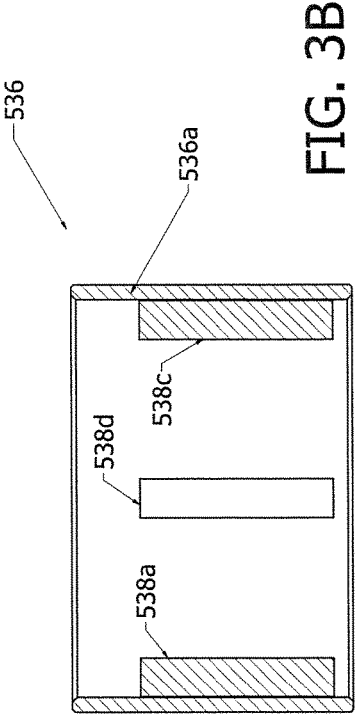
FIG. 3A
FIG. 3B

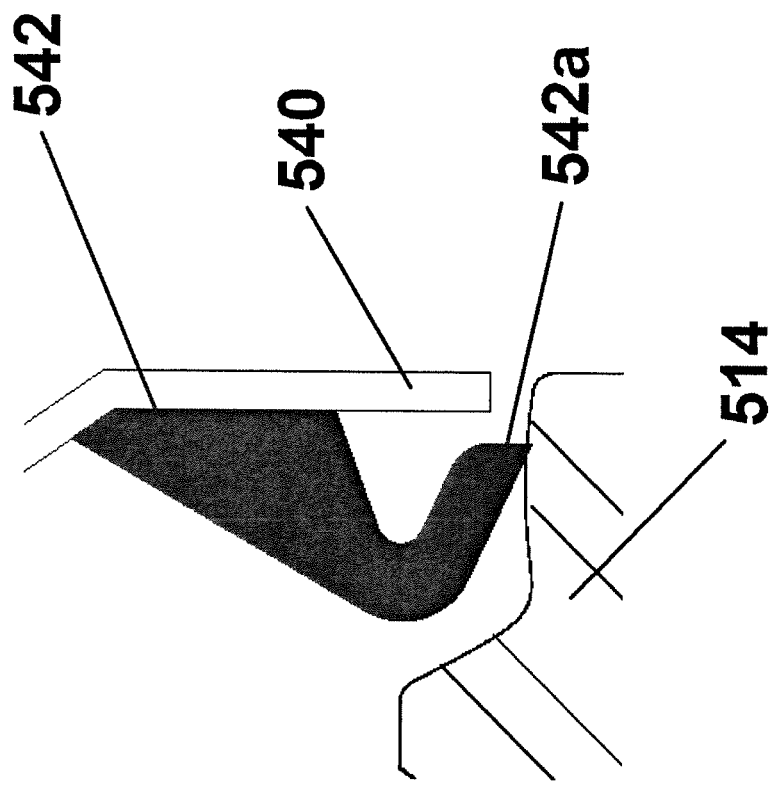

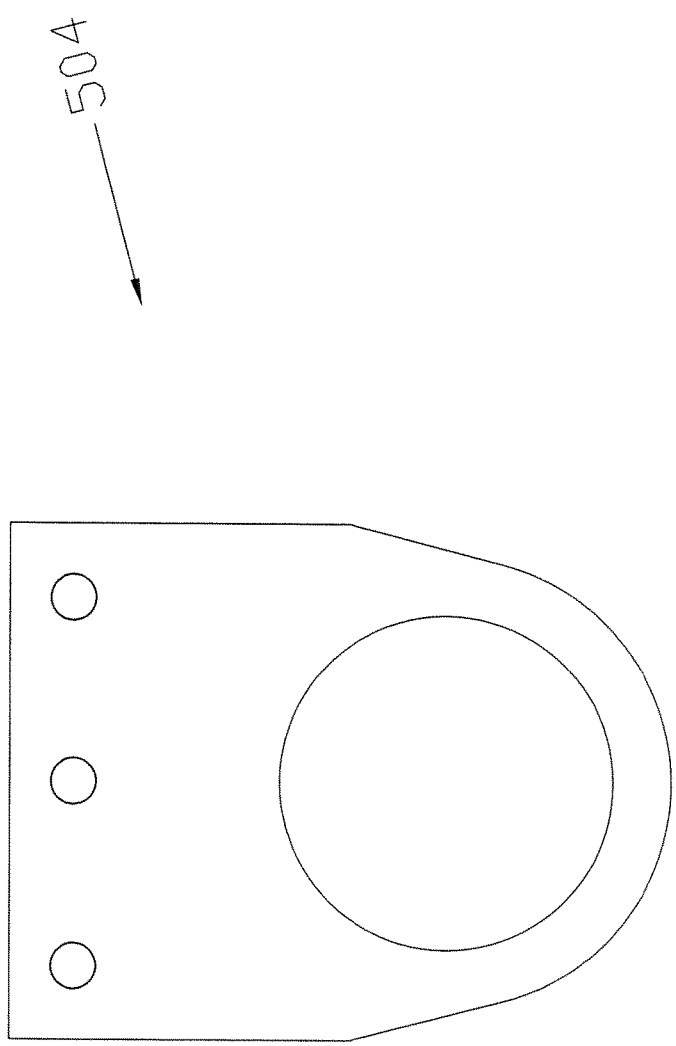

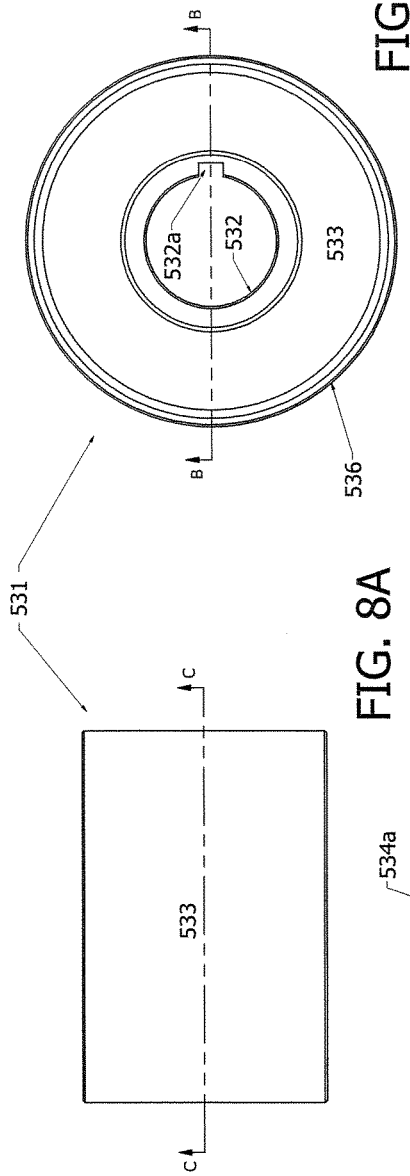
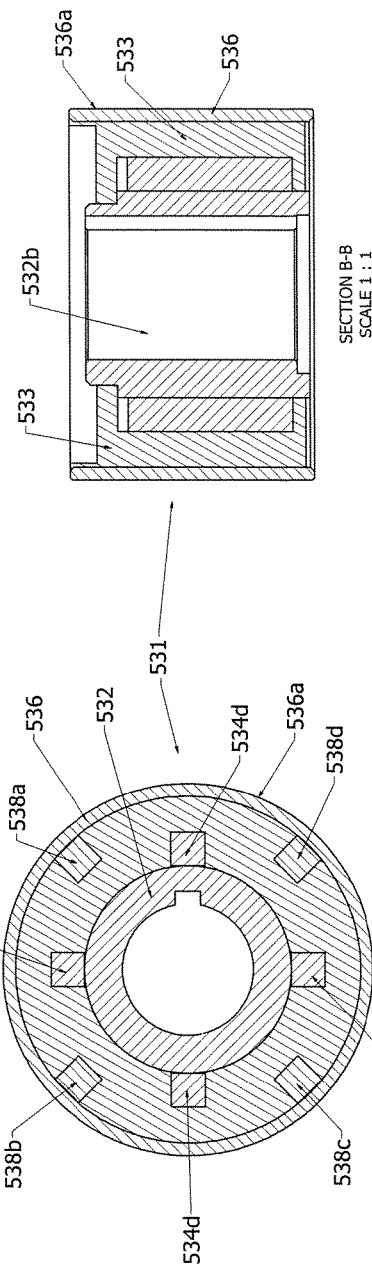
FIG. 8A
FIG. 8C
FIG. 8B
FIG. 8D

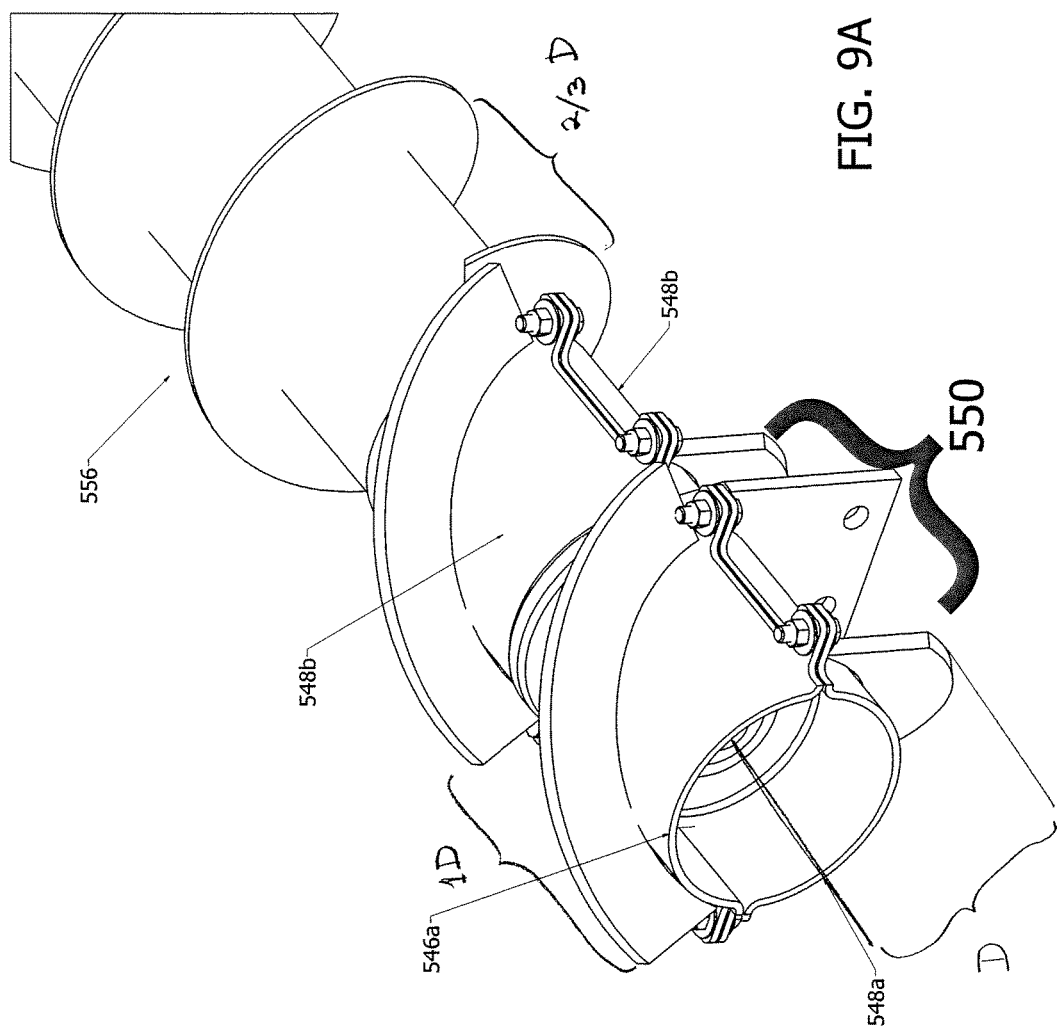

SUPPORT AND COUPLING ASSEMBLY FOR A SCREW AUGER HAVING MULTIPLE COUPLED SCREWS

This application claims priority from, incorporates by reference, and claims the benefit of U.S. Provisional Patent Application Ser. No. 62/147,680, filed Apr. 15, 2015.

FIELD OF THE INVENTION

A device comprising a support and coupling assembly for a screw auger having multiple coupled screw portions engaged through a triple seal bearing assembly.

BACKGROUND OF THE INVENTION

A screw conveyor comprising multiple screw sections is found in the blast cleaning industry, namely, to move blast cleaning shot, for example, in an abrasive reclamation system. The lengths of the screws or screw flights of the screw conveyor may be up to 25 feet. They are rotated relatively slowly by an electric motor. The screws or screw flights are coupled together at support and coupling assemblies that function to support and provide relatively low friction rotation of the screw conveyor. Thus, a support and coupling assembly needs to transfer rotational motion of one screw to the adjacent screw through an assembly which provides support and low friction and also protection against blast cleaning material from entry into the bearings where it could become detrimental to the proper functioning of the assembly.

U.S. Pat. No. 6,398,012, (Volpe, 2002), incorporated herein by reference, discloses a particular type of support and coupling assembly for screw conveyor. The assembly disclosed addresses the shortcomings of prior art screw conveyors, including the difficulty in assembly and disassembly, and the breakdown caused by deflection at the end of the screws, where they are coupled through the support and coupling assembly to adjacent screws.

Applicant herein makes certain improvements to the Volpe support and coupling assembly, as set forth in more detail below. For convenience, Applicant has used three digit element numbers all beginning with the number "5". In the Volpe patent, there are no element numbers that are three digit numbers beginning with the number "5". Moreover, all of Applicant's figures are numbered with a combination of and a letter. All of the numbers of the figures in the Volpe reference do not have a letter associated with them. It is hoped that this helps the reader in understanding the structure and functions advantages of Applicant's invention.

SUMMARY OF THE INVENTION

A multiple seal ball bearing assembly is provided for preventing debris and other matter from getting into the ball bearings of the assembly. The assembly is engaged with a rotating shaft that is keyed to paired hub assemblies with resilient properties. The hub assemblies engage each end of the shaft and provide rotation thereto. Each hub assembly has an outer body with inwardly projecting blades, a center that is keyed to the rotating shaft, the center having outward extending blades. A resilient mass holds the blades in angular orientation with one another. The outer body of the hub assemblies each engage a screw flight, one of the screw flights being rotated, providing torque through the resilient mass to the hub center and shaft, which is transmitted through the bearing assembly to the outer hub, and the screw flight attached thereto.

BRIEF DESCRIPTION OF THE DRAWINGS

FIGS. 2A and 2B are cross-sectional and front views of a bearing hub center for use with a bearing assembly.

FIGS. 3A and 3B are cross-sectional and end views of a bearing hub outer body for use with a bearing assembly.

FIGS. 5A, 5B, 5C, and 5D illustrate a bearing for use in Applicant's hanger bearing assembly.

FIG. 6A illustrates a shaft for use with Applicant's hanger bearing assembly in elevational view with features ghosted in.

FIGS. 7A and 7B illustrate two hanger bracket alternate embodiments; FIG. 7A vertical hanging bracket; FIG. 7B curved bracket for engagement of a side wall.

FIGS. 8A, 8B, 8C, and 8D show various views of a hub assembly.

FIGS. 9A, 9B, and 9C are photographic views of the hub screw connector assemblies engaging the screws to the hubs through the use of fasteners and welds.

FIGS. 10A, 10B, 100, and 10D show various views of how the hub screw connector assemblies and the hub assemblies engage one another.

DETAILED DESCRIPTION OF THE PREFERRED EMBODIMENT

Figure 1A:
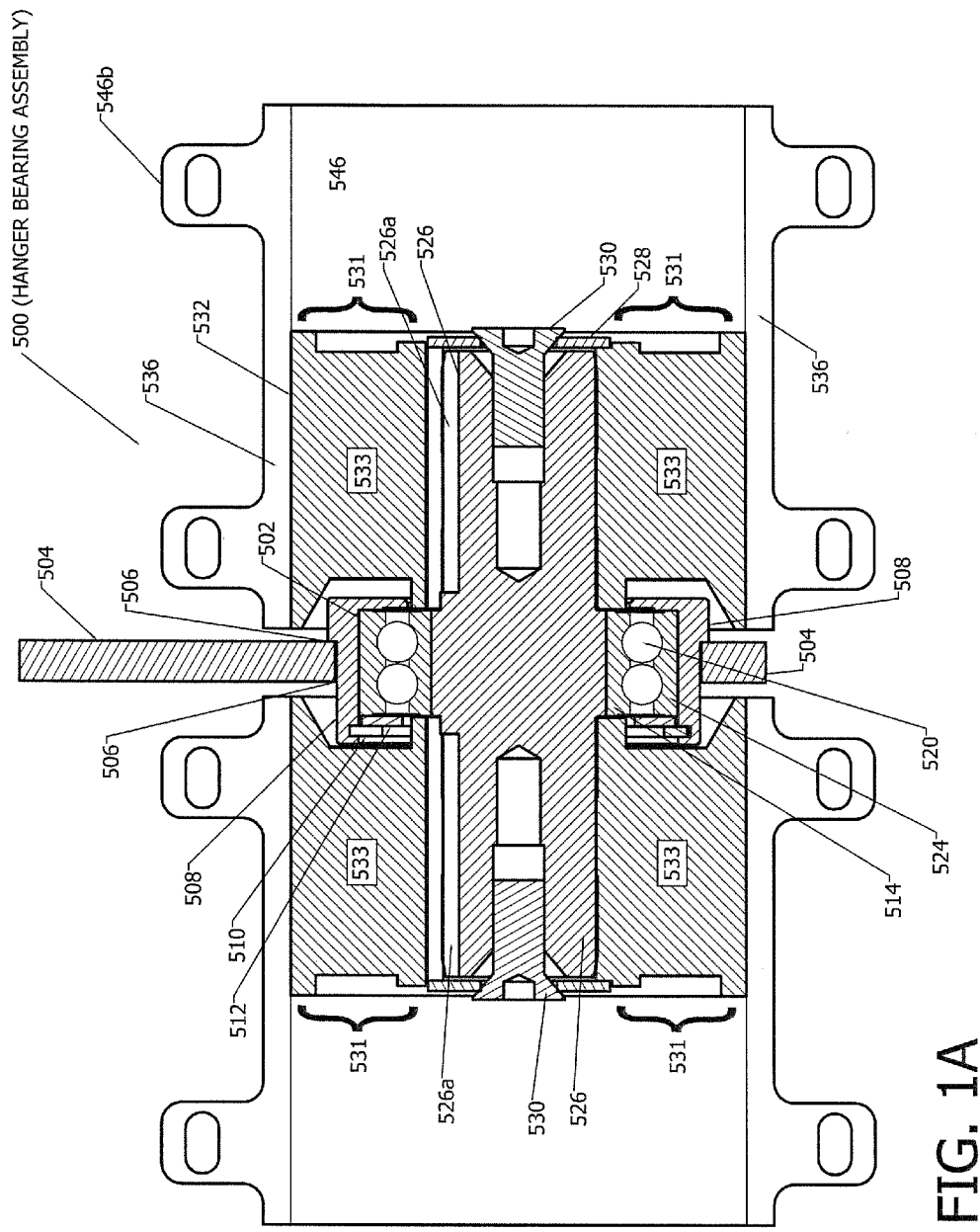
FIG. 1A is a cross-section of a hanger bearing assembly with paired hub assemblies, one to either side of the hanger bracket, with the hanger bracket engaging a carrier, which in turn engages the bearing assembly.
Figure 1B:
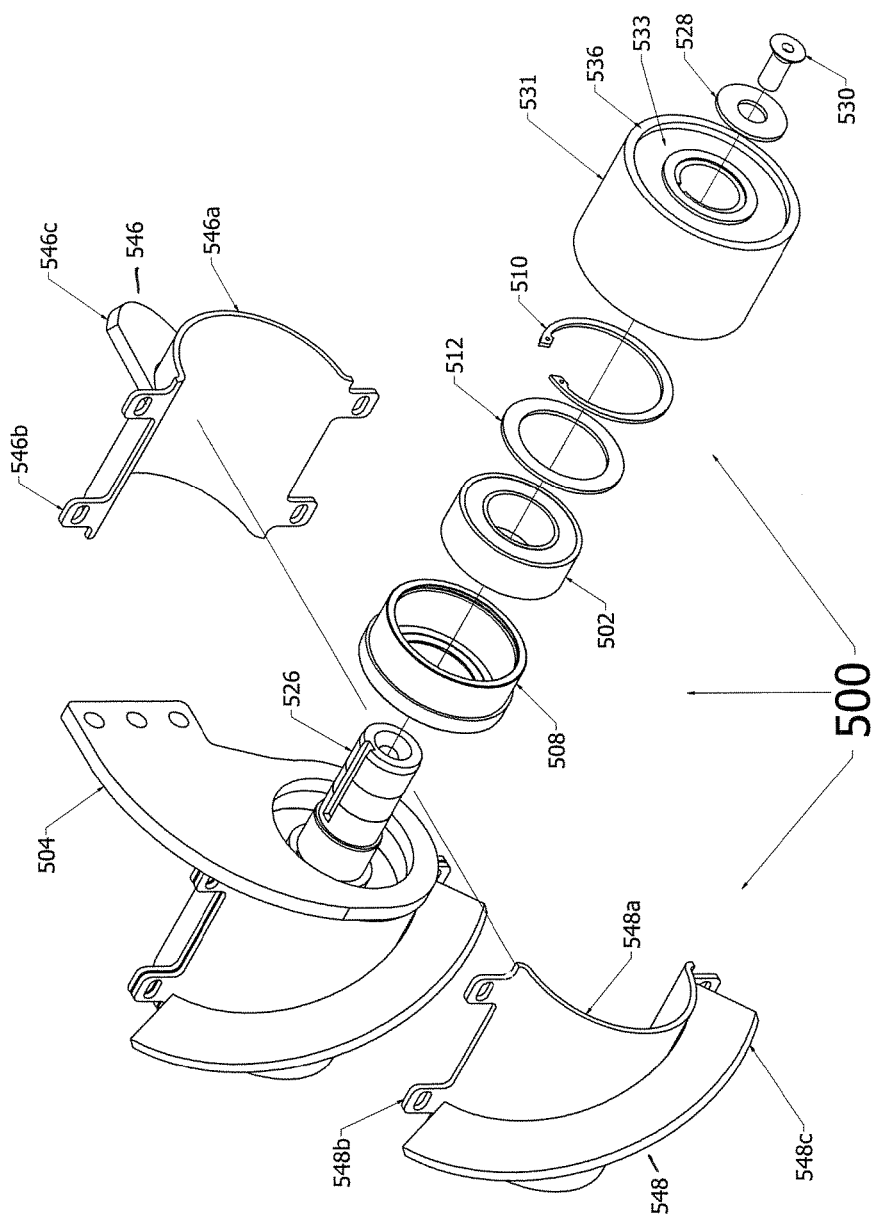
FIG. 1B is an exploded view of the hanger bearing assembly.
Figure 4A:
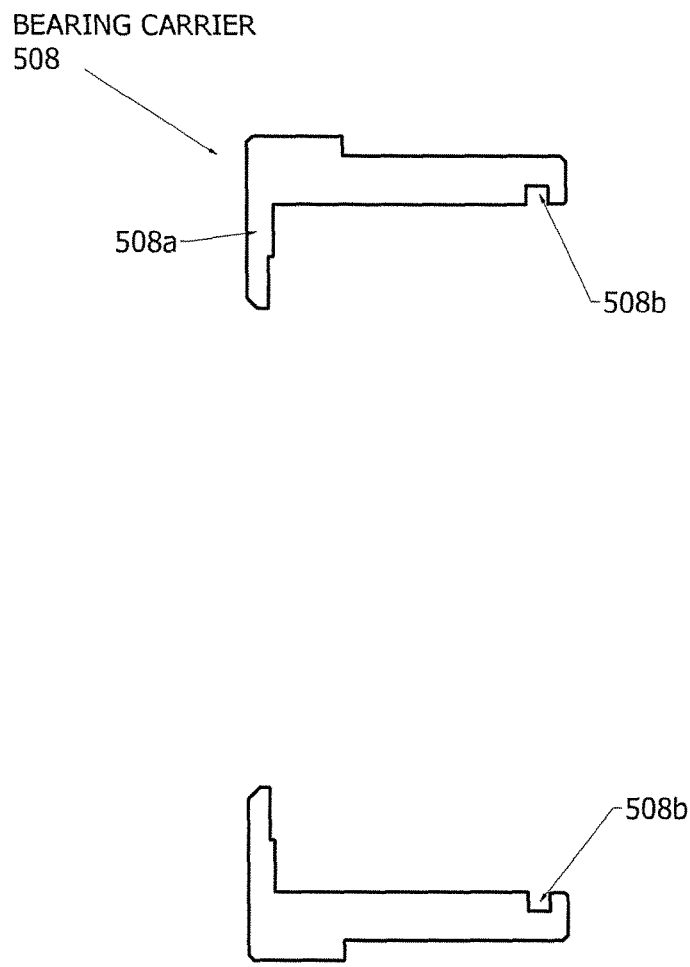
FIG. 4A illustrates a bearing carrier for engaging a bearing to a hanger bearing bracket.
Figures 5A, 5B:
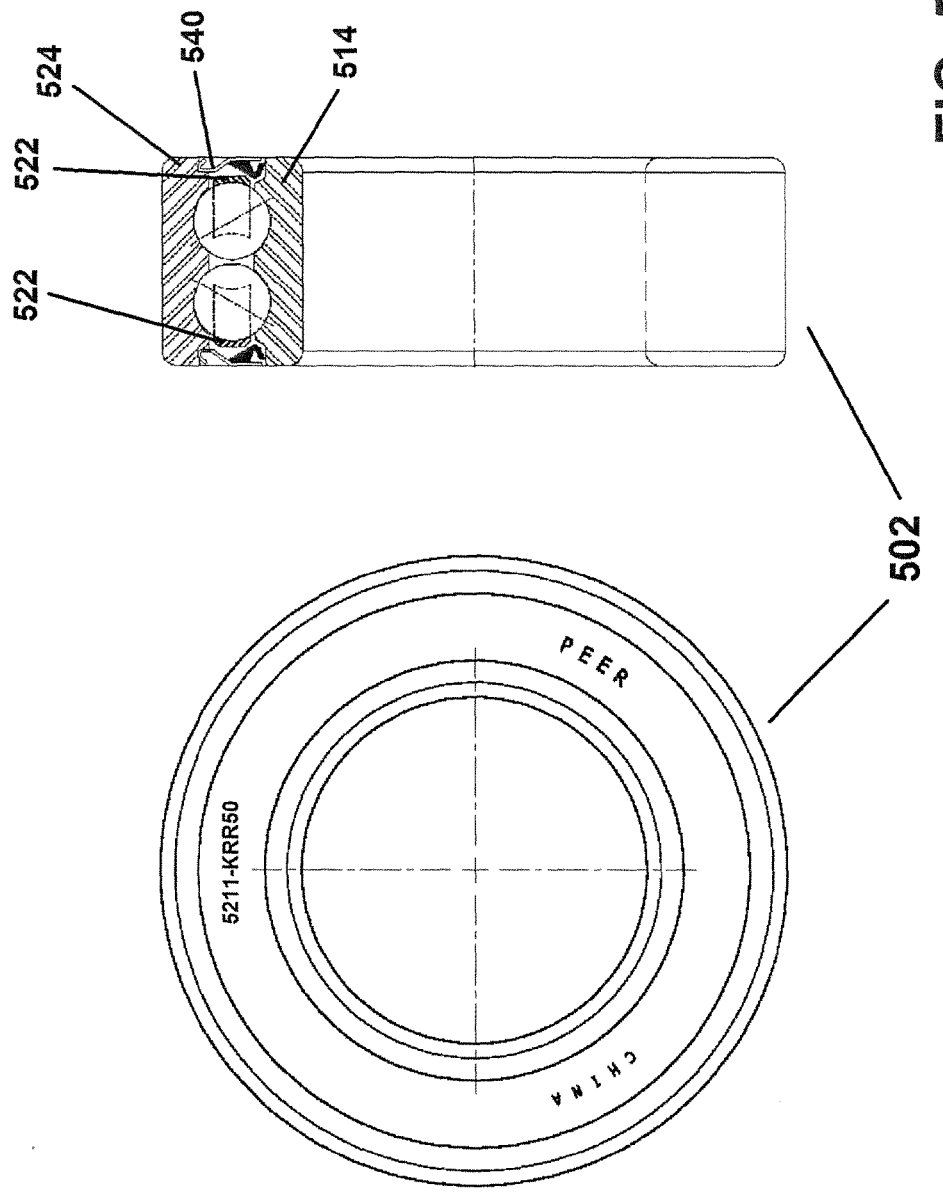
Figure 5C:
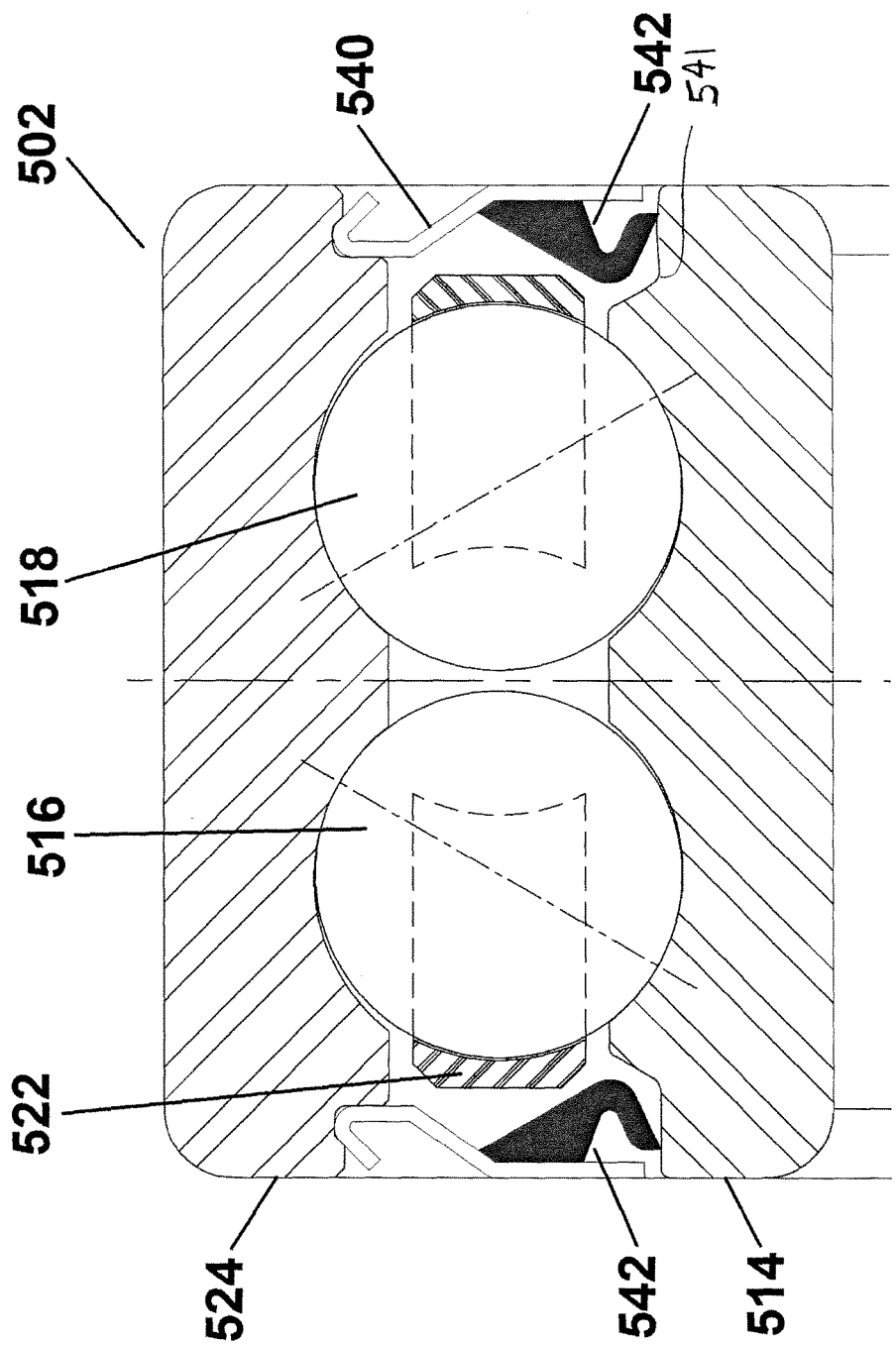
Figure 7B:
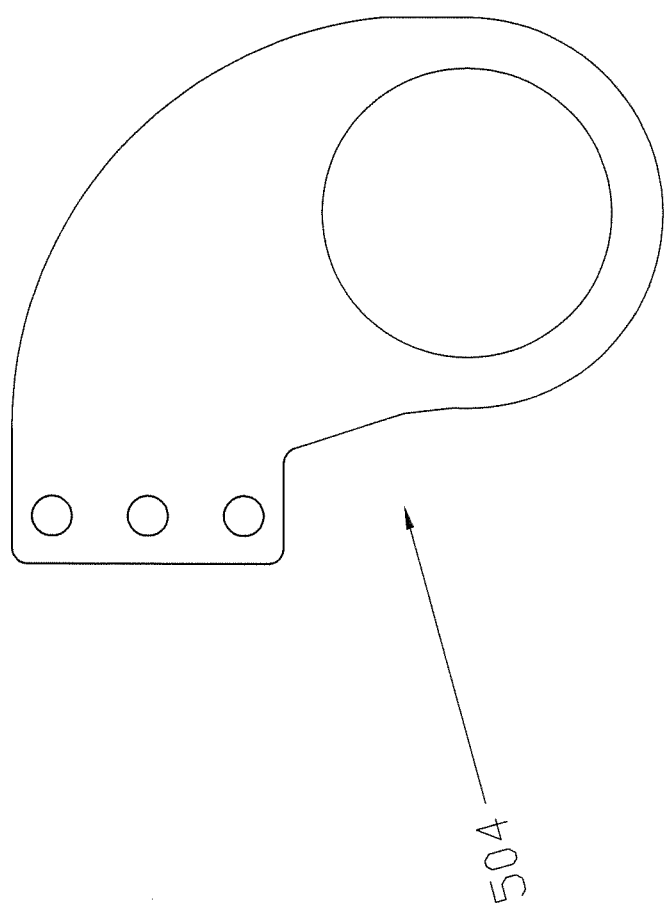

FIGS. 1A, 1B, 2A, 2B, 3A, and 3B illustrate the main components of Applicant's hanger bearing assembly 500. Hanger bearing assembly 500 can be seen to have moveable parts and stationary parts with a bearing 502 therebetween. Moreover, it is seen that the fixed assembly may be supported on a hanger bearing bracket 504 in FIGS. 1A, 7A (vertical) and 7B (side). Hanger bearing bracket 504 is seen to engage a bearing carrier 508, which is cylindrical and having a shoulder 504a on one side and a notch 504b on the other (see FIG. 4A). Notch 504b will receive a split ring retainer rotor clip 510 (see FIG. 1A). A bearing spacer 512 may be used between the inner surface of split ring retainer rotor clip 510 and the outer surface of bearing 502 as seen in FIG. 1A. Bearing 502 (see FIGS. 1A and 5A) typically has an inner race 514 and outer race 524 and a double roll 520 of ball bearings comprising a first row of ball bearings 516 and a second row of ball bearings 518 engaged to one another through the use of a retainer ring or cage 522 (see FIG. 5C)

Figure 6A:
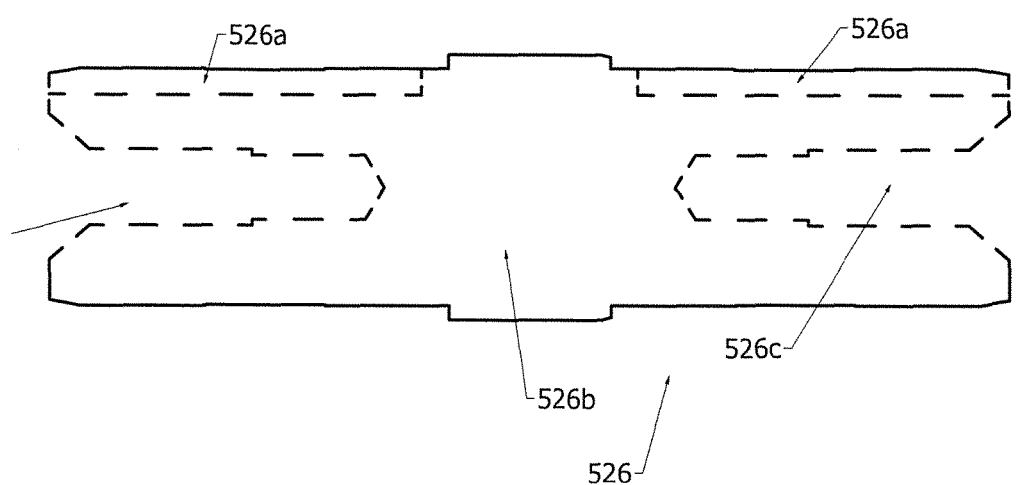

A bearing shaft 526 extends through inner race 514 and is supported by the inner race 514, which bearing shaft includes keyways 526a on either end. A central area 526b has an outer surface thereof that is press fit into the inner race, so that rotation of the shaft and inner race is transferred to the ball bearings. Bearing shaft 526 is tapped 526c at both ends for threaded receipt of a retainer cap screw 530 at the ends (see FIGS. 1A and 6A), which cap screw engages a flat washer 528 as seen in FIG. 1A.

A hub assembly 531 (see FIGS. 1A and 8A-8D) is provide to resiliently transfer torque between rotating screw flights mounted to the hub assemblies on either side of the hanger bearing bracket 504. That is to say, hub assemblies 531 (one on each side of bearing 502) provides resiliency of polyurethane or other resilient element 533 (see FIG. 1A). Each hub assembly 531 is comprised of three parts: bearing hub center 532, bearing hub outer body 536, and resilient element 533. Structurally, one may look at FIG. 1 of the Volpe patent and FIG. 1A of Applicant's patent, and FIG. 2 of the Volpe patent and FIGS. 8A-8D of Applicant's patent to see the structure and function of the hub assembly and the manner in which the resiliency provides for both deflection and some torque absorption.

Bearing hub center 532 is illustrated in FIGS. 1A, 2A, 2B, 8B, 8C, and 8D, and is seen to have a keyway 532a in a central cylindrical body 532b thereof, whose outer surface is seen to be cylindrical with multiple blades 534a/534b/534c/534d extending outwards therefrom.

Hub outer body 536 is seen to comprise a cylindrical shell 536a with a multiplicity, here, four blades 538a/538b/538c/538d, which blades project inward and are surrounded by resilient material 533. Bearing hub center 532 has blades 534a/534b/534c/534d extending radially outward into the same mass of resilient material 533, which may be polyurethane in one embodiment (see Volpe patent, element 84). Body 536a of hub outer body 536 is engaged with screw flights or links on either side and will support the weight and the torque applied by each of those flights during upstart, slowdown, and steady state operation (see FIGS. 9A-9C and 10A-10D).

Figure 9B:
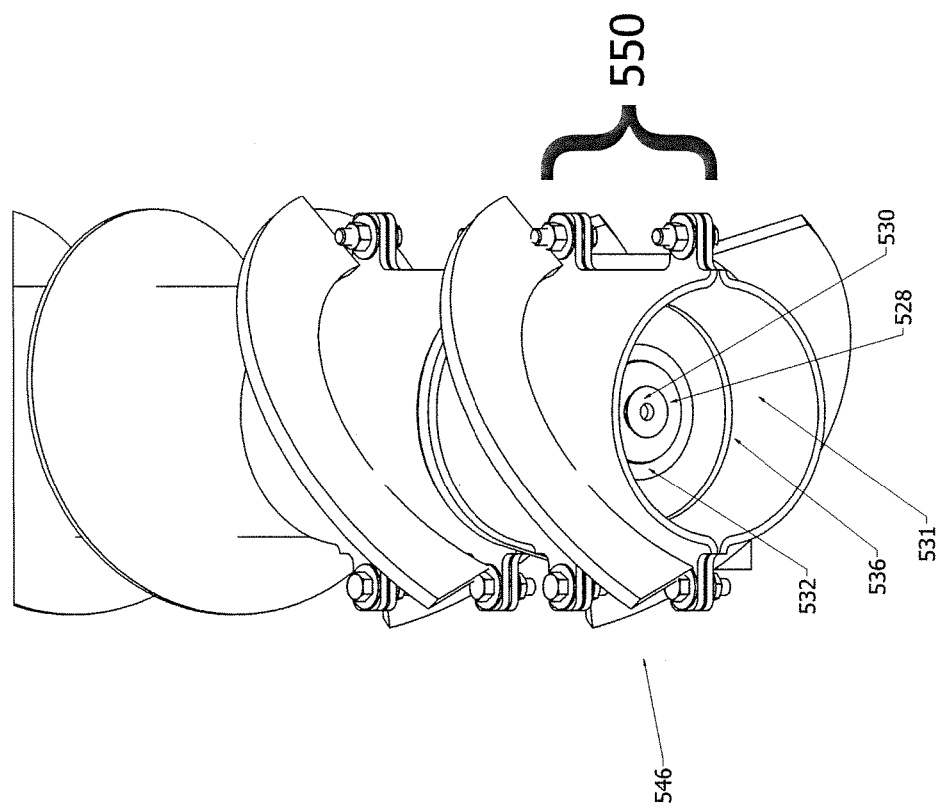
Figure 9C:
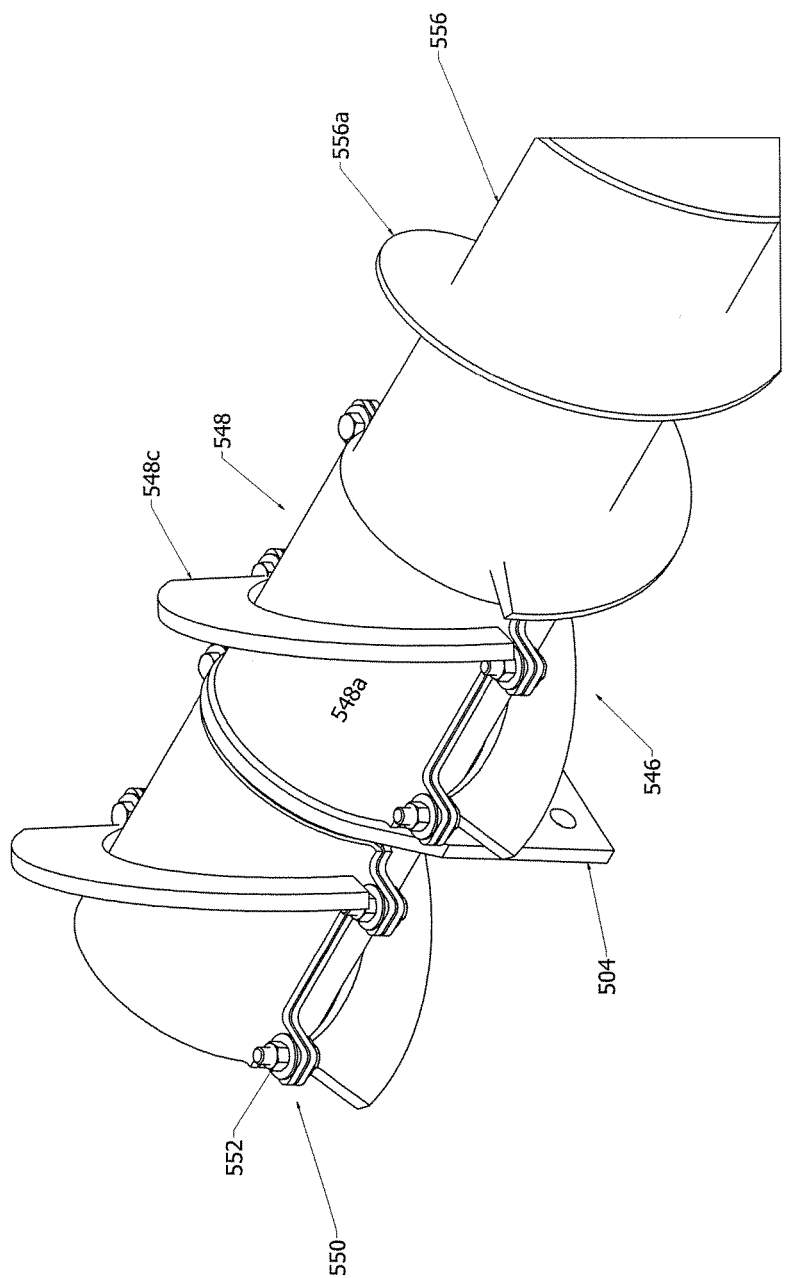

FIGS. 9A, 9B, and 9C, as well as FIGS. 10A, 10B, 100, and 10D illustrate the manner in which hub/screw connector assemblies 550 engage hub assemblies 531 on either side of hanger bearing bracket 504 to connect hub outer body 536 to a first screw 556, such that the screw can transmit rotational torque through bearing 502 to a second screw 556 mounted to a second bearing assembly 531 on the other side of Applicant's hanger bearing assembly 500. More particularly, it is seen that a pair of clam shell shaped tub connector halves 546/548 engage one another through a multiplicity of fasteners 552 so as to transmit rotation through the hanger bearing assembly. More specifically, FIGS. 9A, 9B, and 9C show that similarly dimensioned hub connector half 546 and screw connector half 548, both have bodies 546a/548a, the bodies with fastener engaging ears 546b/548b extending therefrom and the body having, located on the outer surfaces thereof, screw flights 546c/548c.

Figure 10C:
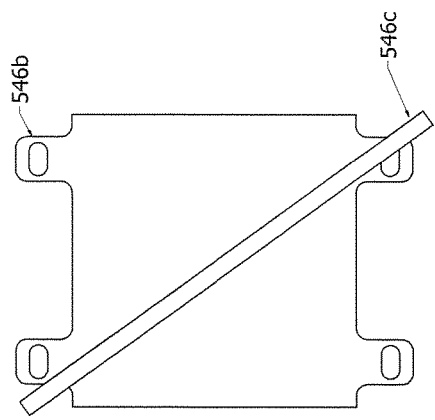
Figure 10B:
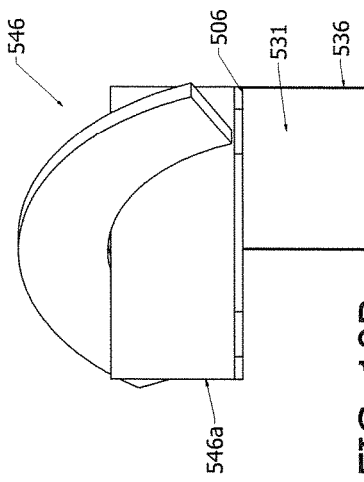
Figure 10D:
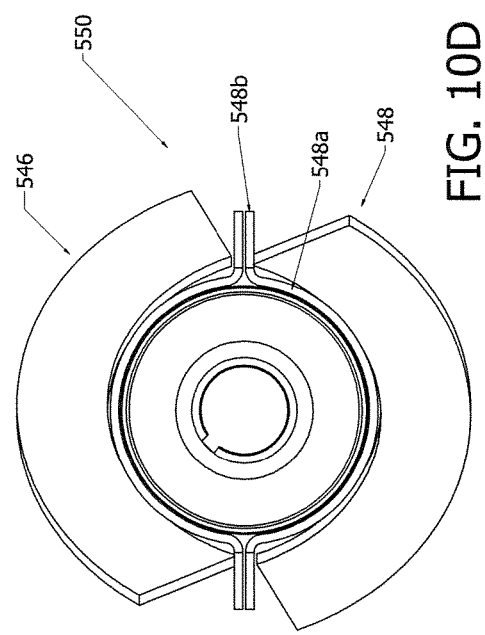
Figure 10A:
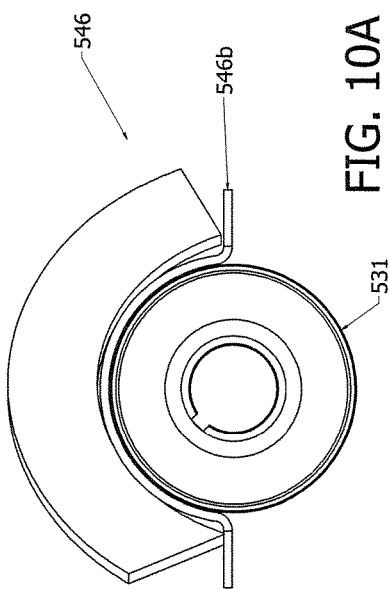

FIG. 10B illustrates the manner in which hub connector half 546 is engaged to bearing hub outer body 536 by a weld 506 or other suitable attachment means. The same figure also illustrates how body 546a extends beyond the outer edge of bearing hub outer body 536. Turning to FIGS. 9C and 10D, it is seen that screw connector half 548 has body 548a that may be welded to the removed end 556a of screw (FIG. 9C) and whose body 548a extends beyond the removed end 556a of screw 556. Joining connector halves 546/548 with fasteners 552 so that the overlap of body 546a and the overlap of body 548a engage as seen in FIGS. 9C and 10A will create a quick fastener removal change out means for elements of Applicant's bearing assembly, while also allowing for the effective transmission of torque through that assembly. There may be a gap "G" of about ¼" to 3/16" between removed end 556a of screw 556 and the outer edge of the hub outer body 536 when connector halves 546/548 are engaged (see FIG. 9C Detail). This will allow for some flex.

FIGS. 9A and 9B also show the manner in which the screw flights of a novel hub/screw connector assembly 550, for example, see FIG. 9A, will be set so that the flights run crosswise with each other, for example, when viewed from above. Moreover, in FIG. 9C, it is seen how a flight at the removed end of the screw will engage the flights of the adjacent hub/screw connector assembly 550. Moreover, the flights of the adjacent hub/screw connector assemblies 550 have removed ends indicated by the arrows A and B in FIGS. 9A and 9C, which removed ends affect a continuation of movement of the media particles transmitted by the screw conveyor across the hanger bearing bracket 504. The ends are aligned so that the screw flights make a continual helical path separated only by a gap across the hanger bearing bracket. FIG. 9C also shows how the pitch of flight 556b of the screw is set adjacent a flight 548c of a hub half. Further, Applicant has changed the pitch from the screw to the hub screw connector assembly so the grit (typically 40-80 grit) is accelerated when it gets to the connector. Acceleration of the grit will help keep it out of the bearing assembly. In one example, the pitch of the single screw flights are 2/3D and Applicant changes the pitch so the flights of the connectors 546/548 have pitches of 1D (see FIG. 9A). This increases the speed of the grit by 50%. In a preferred embodiment, the screw pitch is increased to increase the speed of the grit by at least about 25% more than its speed on the screw flight, or at least 33%. In a preferred range, Applicant's pitch change will increase the speed of the grit from about 25% of the pre-change speed to about 75% of the pre-pitch change.

FIGS. 5A, 5B, 5C, and 5D illustrate details of bearing 502 halves. Bearing 502 is seen to have outer race 524, which engages the bearing carrier and is affixed to the bracket, and inner race 514 pressed onto the shaft, which in turn is keyed to the hub center of each hub assembly and a shield 540. One unique feature of bearing 502 is multiple seals 542 (see in FIG. 5C, one seal on each side) between the outer race 524 and inner race 514. Here, seal 542 is seen to be made of a flexible, elastomeric material, for example, resilient nitrile (Buna-N) with the seal 524, in one embodiment, engaging shield 540, which in turn engages a groove in the outer race in ways known in the art. Seals may be made of nitrile, urethane, Teflon or any other suitable durable, resilient material. The inner race is rotating with respect to the outer race and multiple lips or legs may represent contact points or seals between the outside of the bearing and the ball bearings themselves, thus helping prevent dust, grit, and other matter from obtaining access to the ball bearings. Some ball bearing assemblies come without seals, some come with single or single lip seals, but bearings with multiple seals may be used in the environment described herein, namely, for support of multiple flights of a screw conveyor assembly while keeping grit out. Moreover, shield 540 may also provide a seal function between the outer race and the inner race, but typically does not contact the inner race. One type of bearing that may be used is a Peer 5211, but with flexible seals on each side. In another embodiment, a Peer 5211-KRR50 is called for with flexible legs on both sides (see FIGS. 5A-5D).

A heavy duty, straight edge, staked-in shroud seal 540, with steel shroud is 25-50% thicker than traditional industrial steel shroud designs may be used, this increases resistance to bending and damage from direct contact with contamination (e.g., steel shot).

A precision ground inner ring stepped seal land 541 will provide an optimal sealing surface for long wear life and protection against seal lip inversion when contaminants are forced against the seal lip. The seal lip or legs 542*a* contact the inner ring in a radial plane, making this seal less sensitive to misalignment and axial forces.

Figure 11:
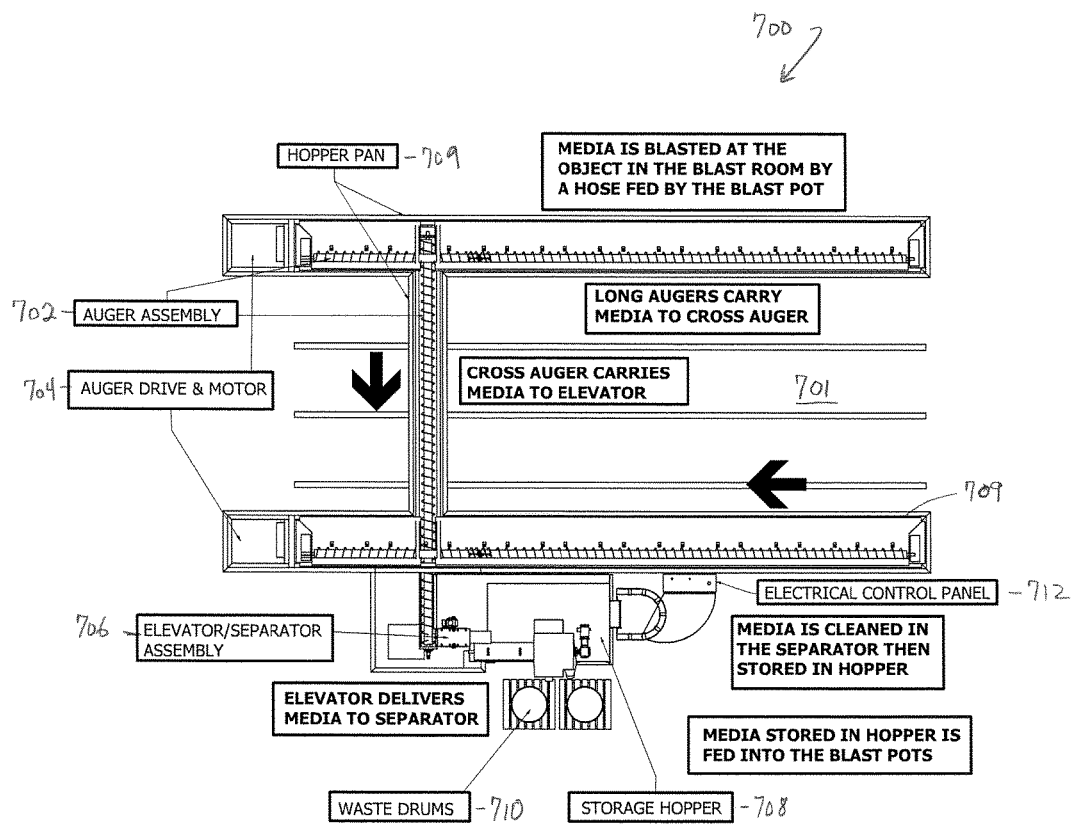
FIG. 11 shows a schematic illustration of some elements of a shot moving system that may use Applicant's hanger bearing assembly.

FIG. 11 illustrates some elements of a media reclamation system 700. These elements may include: blast room 701, auger assembly 702, including screws and Applicant's hanger assembly 500; auger drives and motors 704; elevator/separator assembly 706; hopper storage 708; hopper pans adjacent auger assemblies 709; one or more waste drums 710; and an electrical control panel 712.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A support and coupling assembly for a grit moving screw auger, the support and coupling assembly for engaging a first and a second screw portion, the screw portions having flights with screw portion flight pitches thereon, the support and coupling assembly comprising:
   a hanger bearing assembly having a hanger bearing bracket with an end for engaging a support surface and a removed end, a roller bearing having an inner and an outer race, the outer race being held in place by the removed end of the bracket, and a shaft having removed ends and a central portion, the shaft for press fit engagement with the inner race of the bearing;
   a pair of hub assemblies one each for engaging the removed ends of the shaft so as to rotate therewith; and
   a pair of connector assemblies, one connector assembly of the pair for connecting one of the hub assemblies to the first screw portion, the other connector assembly of the pair for connecting the other hub assembly to second screw portion, the connector assemblies to removably connect the screw portions to the hub assemblies with fasteners;
      wherein each connector assembly has a flight on an exterior surface thereof, the flights with a flight pitch adapted to increase the speed of the grit when it reaches the connector assemblies, compared to the grit speed in contact with the screw portions.

2. The assembly of claim 1, wherein the change in pitch increases the speed of the grit by at least about 25%.

3. The assembly of claim 1, wherein the change in pitch increases the speed of the grit by at least about 33%.

4. The assembly of claim 1, wherein the change in pitch increases the speed of the grit by about 25% to about 75%.

5. The assembly of claim 4, wherein the roller bearing is a double row bearing with two shields and two flexible, elastomeric seals.

6. The assembly of claim 1, wherein the hub assemblies include resilient elements.

7. The assembly of claim 1, wherein each connector assembly has two hub halves.

8. A support and coupling assembly for a grit moving screw auger, the support and coupling assembly for engaging a first and a second screw portion, the screw portions having flights with screw portion flight pitches thereon, the support and coupling assembly comprising:
   a hanger bearing assembly having a hanger bearing bracket with an end for engaging a support surface and a removed end, a roller bearing having an inner and an outer race, the outer race being held in place by the removed end of the bracket, and a shaft having removed ends and a central portion, the shaft for press fit engagement with the inner race of the bearing;
   a pair of hub assemblies for engaging the removed ends of the shaft so as to rotate therewith; and
   a pair of connector assemblies, one connector assembly of the pair for connecting one of the hub assemblies to the first screw portion, the other connector assembly of the pair for connecting the other hub assembly to second screw portion, the connector assemblies to rigidly but removably connect the screw portions to the hub assemblies with fasteners;
      wherein each connector assembly has a flight on an exterior surface thereof, the flights with a flight pitch adapted to increase the speed of the grit when it reaches the connector assemblies, compared to the grit speed in contact with the screw portions;
      wherein the change in pitch increases the speed of the grit by about 25% to about 75%; and
      wherein the roller bearing is a double row bearing with two shields and two flexible, elastomeric seals.

9. An abrasive reclamation system for use with a media blast room, the abrasive reclamation system comprising:
   an auger motor and drive assembly;
   a separator;
   a hopper;
   waste drains; and
   a support and coupling assembly comprising:
      a first and a second screw portion, the screw portions having flights with screw portion flight pitches thereon, the support and coupling assembly:
      a hanger bearing assembly having a hanger bearing bracket with an end for engaging a support surface and a removed end, a roller bearing having an inner and an outer race, the outer race being held in place by the removed end of the bracket, and a shaft having removed ends and a central portion, the shaft for press fit engagement with the inner race of the bearing;
      a pair of hub assemblies for engaging the removed ends of the shaft so as to rotate therewith; and
      a pair of connector assemblies, one connector assembly of the pair for connecting one of the hub assemblies to the first screw portion, the other connector assembly of the pair for connecting the other hub assembly to second screw portion, the connector assemblies to removably connect the screw portions to the hub assemblies with fasteners;
         wherein each connector assembly has a flight on an exterior surface thereof, the flights with a flight pitch adapted to increase the speed of the grit when it reaches the connector assemblies, compared to the grit speed in contact with the screw portions.

10. The abrasive reclamation system of claim 9, wherein the change in pitch increases the speed of the grit by at least about 25%.

11. The abrasive reclamation system of claim 9, wherein the change in pitch increases the speed of the grit by at least about 33%.

12. The abrasive reclamation system of claim 9, wherein the change in pitch increases the speed of the grit by about 25% to about 75%.

13. The abrasive reclamation system of claim 9, wherein the roller bearing is a double row bearing with two shields and two flexible, elastomeric seals.

14. The abrasive reclamation system of claim 9, wherein the hub assemblies include resilient elements.

15. The abrasive reclamation system of claim 9, wherein each connector assembly has two hub halves.

16. The abrasive reclamation system of claim 9, wherein the change in pitch increases the speed of the grit by about 25% to about 75%; wherein the roller bearing is a double row bearing with two shields and two flexible, elastomeric seals; and wherein the hub assemblies include resilient elements.

17. The abrasive reclamation system of claim 16, wherein each connector assembly has two hub halves.

* * * * *